(No Model.) 2 Sheets—Sheet 1.

H. R. ROBBINS.
CAN SOLDERING MACHINE.

No. 246,820. Patented Sept. 6, 1881.

WITNESSES:
J. W. Garner
Amos W. Hart

INVENTOR:
H. R. Robbins
BY
ATTORNEYS.

(No Model.) 2 Sheets—Sheet 2.

H. R. ROBBINS.
CAN SOLDERING MACHINE.

No. 246,820. Patented Sept. 6, 1881.

WITNESSES:
J. W. Garner
Amos W. Hart

INVENTOR:
H. R. Robbins
BY
ATTORNEYS.

UNITED STATES PATENT OFFICE.

HENRY R. ROBBINS, OF BALTIMORE, MARYLAND, ASSIGNOR TO HIMSELF AND JAMES E. AND JOHN B. STANSBURY, OF SAME PLACE.

CAN-SOLDERING MACHINE.

SPECIFICATION forming part of Letters Patent No. 246,820, dated September 6, 1881.

Application filed April 5, 1881. (No model.)

*To all whom it may concern:*

Be it known that I, HENRY R. ROBBINS, of Baltimore city, Baltimore county, Maryland, have invented a new and useful Improvement in Can-Soldering Machines; and I do hereby declare that the following is a full, clear, and exact description of the same.

The object of my invention is to provide an improved machine for soldering the heads of tin cans to the bodies thereof.

I provide vertically-movable supports and rotary holders or clamps for the can, and apply the solder by means of devices that are adapted to reciprocate vertically.

The construction and combination of parts are as hereinafter described, reference being had to accompanying drawings, in which—

Figure 1:
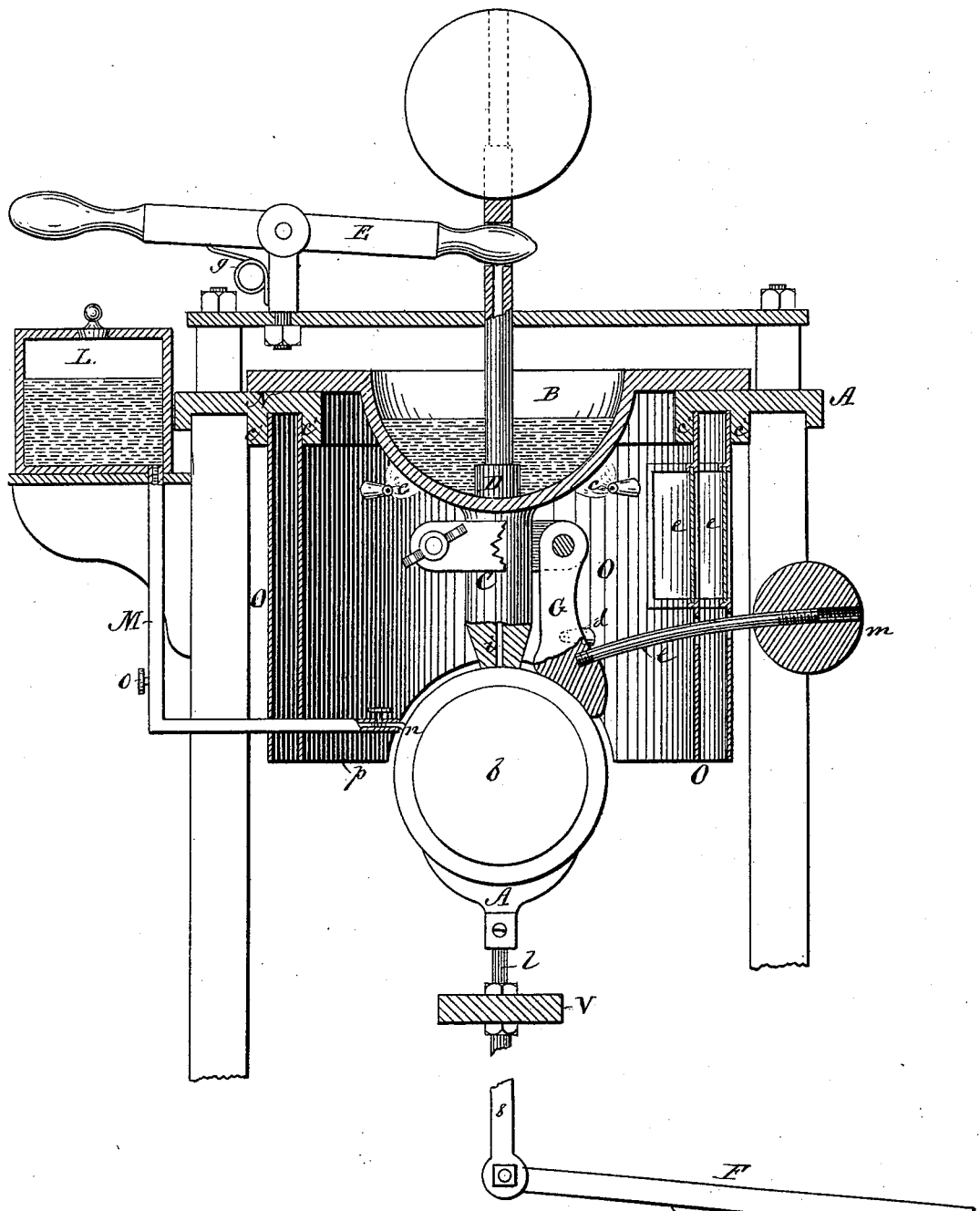
Figure 2:
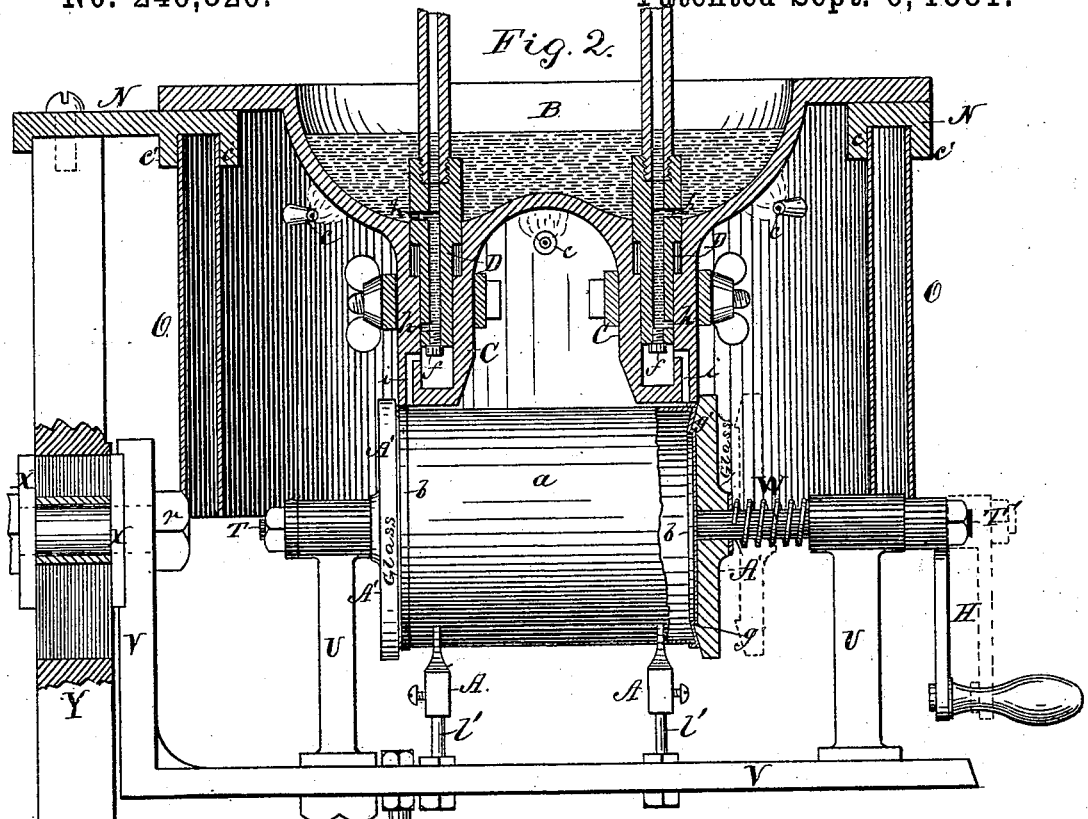
Figure 5:
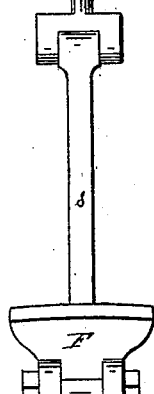
Figure 3:
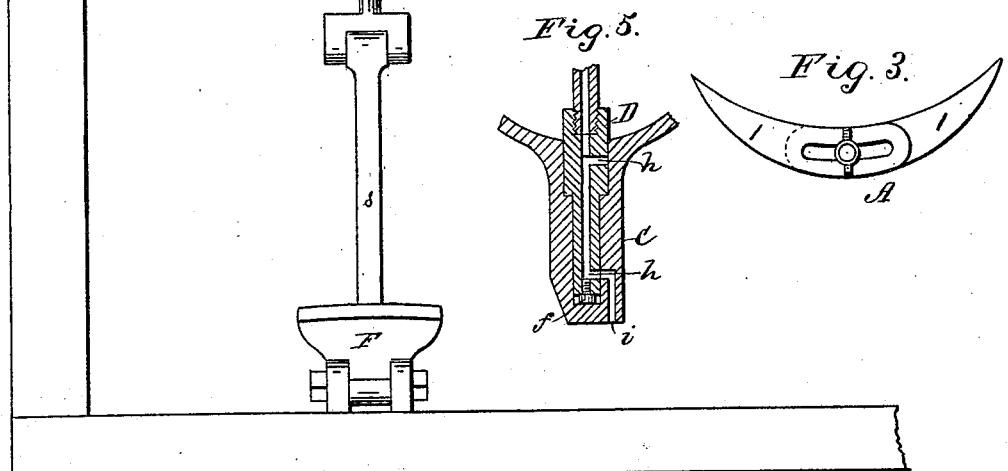
Figure 4:
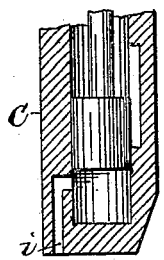

Figures 1 and 2 are different sectional elevations of the machine. Figs. 3, 4, 5 are detail views, hereinafter referred to.

The general operations of the can-soldering appliances are as follows: The cylindrical body $a$ of a can, having heads $b$ applied thereto, is placed on supports A and clamped endwise between glass disks A'. The solder is placed in a hemispherical or cup-shaped receptacle or hopper, B, and kept in a molten condition by means of gas-jets directed from circumjacent burners $c$. The hopper B has two downward tubular extensions, C, in each of which is placed a hollow piston or charger, D. The chargers are operated—that is to say, forced down—by levers E at the same time that the bar or frame to which the can supports and holders are attached is raised by means of a treadle or foot-lever, F, to bring the can in contact with the soldering-irons G and points of the hopper-extensions C, through which latter the solder discharges upon the joints of the can-heads. At the same moment that the can is thus elevated the disks or holders A' are set in rotation by the crank H. A suitable liquid flux is also simultaneously applied to the can-joint, the same being supplied from a reservoir, L, through pipe M. Thus the application of the solder and flux and the soldering-irons to the joints is effected at the same time, so that when the can-holders A' have made a complete rotation the joints will have been firmly soldered and the can then ready to be removed to allow another to be substituted for repeating the operation.

I will now describe with more particularity the construction and operation of the above and other connected parts.

The annular plate N, to which the hopper B is attached, has parallel pendent flanges $c'$ $c'$, to which is secured the sheet-metal hollow-walled cylinder O. The latter extends downward far enough to surround or inclose the hopper B, gas-burners $c$ $d$, soldering-tool G, and part of the can-holders A', and hence to a great extent prevents the radiation of heat upon the workmen or operator. In order to enable the latter to watch the soldering operation I provide the cylinder O with a mica window, $e$, as shown in Fig. 1. The soldering-iron G is heated by a jet from gas-burner $d$. The chargers D are extended through a bearing in the top of the hopper B, and connected with one end of the horizontal levers, whose other end projects laterally. The chargers D are also weighted to insure steadiness of movement, and a spring, $g$, is arranged to support the lever, so that no solder will be discharged, except at the will of the operator. The chargers proper are in the nature of tubes and attached to the stems or tubes, with which the levers connect by means of screw-joints, which permit them to be conveniently detached when required for the purpose of cleaning. A screw-plug, $f$, is likewise inserted in the lower end for the purpose of facilitating such operation.

The hollow portion of the chargers D has a lateral opening, $h$, at the top and bottom, and when raised, as shown in full lines, Fig. 2, the molten solder enters the charger, and when depressed, as shown in full lines in Figs. 4, 5, the supply is cut off, and the discharge-opening $h$ coincides with the opening $i$ in the lower end of the tubes C, so that the solder will run out on the can-joints as the holders A' rotate. In practice, however, the lever E will be tilted and the chargers D raised an instant before the can-holders A' complete their rotation. In other words, the chargers D are raised and the discharge of solder cut off while the can-holders A' are still rotating, the object being to prevent the double application of solder at one point on the periphery and to allow the tool G to properly smooth and sweat the solder into the joints or seams. The can-support A and holders A' are then lowered, and the can $a\,b$ detached from the same and another substituted. The treadle-lever F is then depressed again to raise the can supports and holders A A' to the same position as before for repeating the operation.

The soldering-irons G are pivoted to yokes or screw-clamps, which are secured to the downward extensions C of the hopper B, and provided with an arm, $l$, carrying a weight, $m$, which is made adjustable therein by means of a screw-joint, to enable the pressure of the irons on the can to be varied as required by the varying condition of the work to be done.

Prior to the application of the solder, as above described, a liquid flux is applied to the can-joint by means of a wick, $n$, projecting or pendent from the pipe M, which leads from the reservoir L. The discharge of flux may be cut off by a cock or valve, $o$, and the wick is adjusted in length by means of a notched wheel, $p$, operated by a milled head.

The can-supports A are crescent-shaped, their upper edges conforming to the cylindrical shape of the can $a$. For different sizes of cans different supports may be provided; but I show in Fig. 3 a form of support which is adapted for use with various sizes. It consists of two curved divergent arms, 1 1, which are adjustable on a common center, and a clamp-screw for securing them in the required position. The supports are provided with sockets and applied to vertical stems or standards $l'$, on which they may be adjusted vertically and clamped by screws for the purpose of securing the required local relation between the supports A and holders A'.

The holders A' are placed vertically parallel, and have a circular rib, $g'$, on their inner faces contiguous to the periphery. This rib enters the corresponding circular groove in the can-head $b$, and thus serves to prevent its lateral movement.

The holders A' are constructed of glass, to which material molten solder will not adhere. They are attached to the inner ends of horizontal journals T T', having their bearings in the elongated heads of standards U U, which, like the standards of the supports A, are rigidly bolted to the horizontal bar V. The journal T has no axial movement in its bearing, but the other, T', has a sufficient one for allowing the holder A', which is attached thereto, to be drawn back, as shown in dotted lines, Fig. 2, as required to permit insertion and removal of the can. Between such holder A' and the head of the standard $v$ a spiral spring, W, encircles the journal T', and serves to press the holder forward against the can, so as to clamp it firmly. The crank H, before referred to, is affixed to the outer end of said journal for the double purpose of rotating the holders A' A' and the can $a$, held by friction between them, and of retracting or drawing back the contiguous holder against the tension of spring W, as will be readily understood.

The bar V, carrying the can-supports A A and clamping-disks A', has a vertical portion, that is rigidly attached to a sleeve, X, that slides on a vertical standard, Y. The same bolt, $r$, that secures the parts V Y together passes through a vertical slot in said standard. The treadle F is connected with this bar V by a link, $s$, and the operation of the treadle raises the bar and its attached can-holding devices, in which case the sleeve X and bolt $r$ slide respectively on and in the standard Y. The other end of bar V may be similarly connected with a vertical standard, if preferred, and in such case the treadle would necessarily be connected with the bar at the middle of its length, instead of at a point near its inner end, as at present.

I show in Fig. 4 an alternative construction of the solder-chargers, in which a valve or piston is employed to cut off the delivery of solder into the can.

I may employ a treadle for operating the levers; but, as the result of practical tests, I prefer to operate them by hand.

In place of raising and lowering the can supports and holders, they might be made stationary and the hopper B and soldering-irons be made to descend into contact with the can.

What I claim as my invention is—

1. In a can-soldering machine, the combination, with the molten-solder receptacle, of the vertical solder-discharge tubes, the soldering-irons secured to the latter and pivoted so as to hang pendent in position to press on the can-seams, and the rotating can-holder, substantially as shown and described.

2. In a can-soldering machine, the combination, with the receptacle for molten solder and a tube pendent therefrom, and provided with a discharge-opening, of the charger having a tubular portion with lateral induction and discharge openings at the top and bottom, respectively, which openings are so located that they are closed and unclosed alternately when the charger is adjusted vertically, as specified.

3. In a can-soldering machine, the combination, with the vertically-reciprocating charger and molten-solder receptacle, having a tubular extension, as specified, of the lever E and a spring connected and arranged to operate as shown.

4. The combination, with the solder-receptacle having vertical discharge-tubes and the soldering-irons, pivoted as specified, of the rotating can-holder, the horizontal bar supporting the latter and sliding on a vertical standard, and the treadle for adjusting said bar, substantially as shown and described.

5. In a can-soldering machine, the combination of liquid-flux holder, pipe M, and wick and wick-adjusting wheel, and rotating can-holders, as shown and described.

6. The combination of the tubular solder-chargers, having an axial hole closed by a screw-plug at the bottom, with the stems for operating them, the two (charger and stem) being connected by a screw-joint, whereby said chargers are adapted to be conveniently detached and cleaned, in the manner hereinbefore specified.

7. The can-supports constructed of jointed adjustable curved arms, as shown and described.

8. The combination, with the solder-receptacle and a pair of irons attached thereto, of the vertically-reciprocating revolving can-holders mounted in bearings under said receptacle, and consisting of the two-part shaft having terminal disks, as specified.

9. The combination, with the solder-receptacle having two depressions in its bottom and the two soldering-irons attached thereto, of the revolving can-holders and mechanism for reciprocating the latter, as shown and specified.

10. In combination, the rotating can-holder, a vertically-movable support therefor, and the treadle F, the slotted guide, the solder-receptacle, and soldering-irons, both the receptacle and irons being fixed as to vertical movement, all substantially as shown and described.

11. The combination of the can-holder formed of the journals T T', having disks attached, the can-supports, bar V, treadle F, slotted standard, and the solder-receptacle, all as shown and described.

HENRY R. ROBBINS.

Witnesses:
W. H. PENDLETON,
E. S. ROBBINS.